United States Patent Office 3,189,620
Patented June 15, 1965

3,189,620
16-ACETYL PREGNANE DERIVATIVES
Pierre Crabbé, Mexico City, Mexico, assignor to Syntex Corporation, Panama, Panama, a corporation of Panama
No Drawing. Filed Sept. 5, 1962, Ser. No. 221,431
4 Claims. (Cl. 260—397.4)

The present invention relates to novel cyclopentanophenanthrene derivatives and to a process for the production thereof.

More particularly the present invention relates to novel 16-acetyl-pregnane derivatives.

The novel compounds of the present invention, which are progestational type agents with a high anti-ovulatory activity and also anti-estrogenic and anti-androgenic agents, are represented by the following formulae:

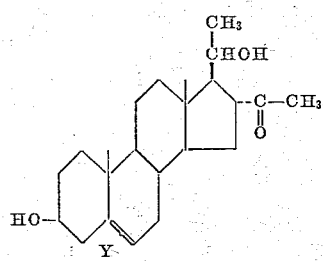

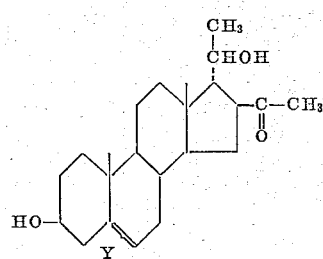

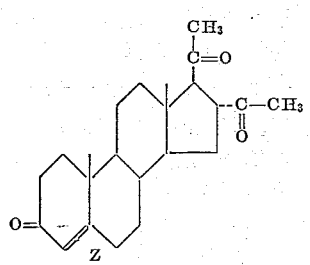

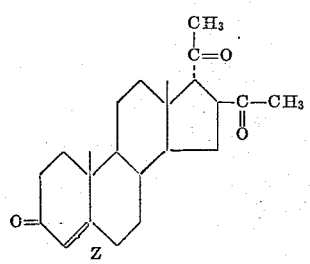

In the above formulae Y represents a double bond or a saturated linkage, each between C–5 and C–6; and Z represents a double bond or a saturated linkage, each between C–4 and C–5.

The novel 17β-pregnane derivatives of the present invention are prepared by the process illustrated as follows:

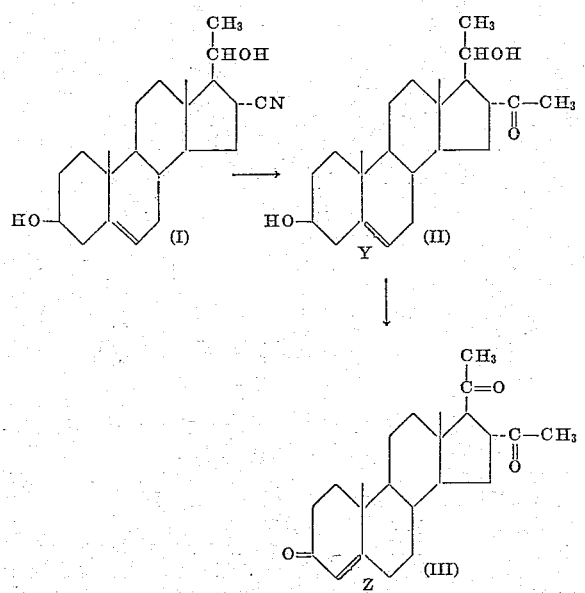

In the above formulae Y and Z have the same meaning as previously defined.

In practicing the process outlined above the starting 16α-cyano-Δ⁵-pregnene-3β,20β-diol (I) upon treatment with excess methyl magnesium iodide, in toluene-ether solution preferably at reflux temperature for a period of time of the order of 22 hours, followed by acid hydrolysis, yields 16α-acetyl-Δ⁵-pregnene-3β,20β-diol (II: Y=double bond), which is hydrogenated in the presence of a suitable catalyst, such as platinum oxide, to give 16α-acetyl-allopregnane-3β,20β-diol (II: Y=saturated linkage). The above 3β,20β-diols, upon treatment under conventional Oppenauer conditions, yield the corresponding 16α-acetyl-3,20-dione derivatives (III).

The novel 17α-pregnane derivatives of the present invention are prepared by the process illustrated by the following equation:

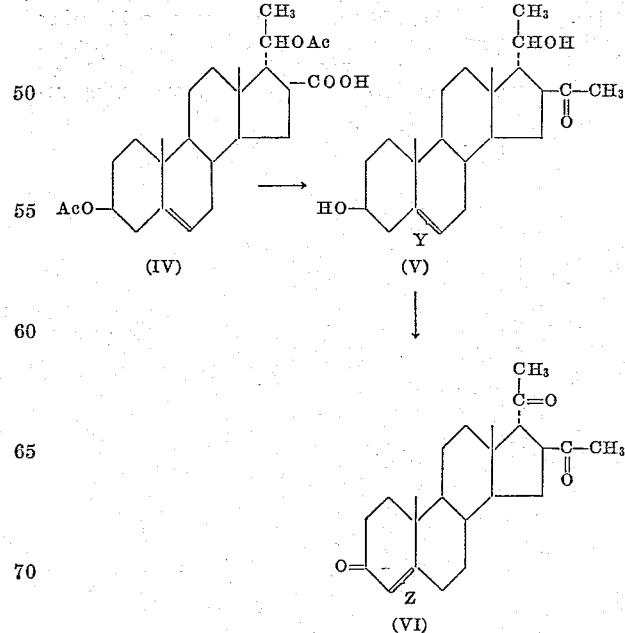

In the above formulae Y and Z have the same meaning as previously described and Ac represents the acetyl radical.

In practicing the process just outlined the starting 16β-carboxy-Δ⁵-17α-pregnene-3β,20β-diol diacetate (IV) upon treatment with thionyl chloride, preferably in benzene solution at reflux temperature, for approximately 2 hours yields the corresponding 16β-carboxylic acyl chloride, which by reaction with methyl cadmium, in a solvent inert to the reagent, such as benzene, preferably at reflux temperature for a period of time of the order of 4 hours, followed by acid hydrolysis, furnishes 16β-acetyl-Δ⁵-17α-pregnene-3β,20β-diol (V: Y=double bond). The latter Δ⁵-derivative, upon conventional hydrogenation in the presence of a suitable catalyst, such as 5% palladium-on-charcoal, yields 16β-acetyl-17α-allopregnane-3β,20β-diol (V: Y=saturated linkage).

The 16β-acetyl-3β,20β-diol derivatives (V) upon conventional Oppenauer oxidation afford the corresponding 16β-acetyl-3,20-dione derivatives (VI).

The following specific examples serve to illustrate but are not intended to limit the scope of the present invention:

*Example I*

A solution of 6 g. of 16α-cyano-Δ⁵-pregnene-3β,20β-diol (Mazur et al., Tetrahedron, 7, 130 [1959]), in 700 cc. of toluene was heated to the boiling point and 50 cc. of solvent were allowed to distil off. Thereafter were added 200 cc. of a 4 N ethereal solution of methyl magnesium iodide and the resulting mixture was allowed to reflux for 22 hours under anhydrous conditions, then it was ice-cooled, water was added thereto, and the organic layer was washed with 5% aqueous hydrochloric acid and then with water. The moist organic phase was dried over anhydrous sodium sulfate and evaporated to dryness. The residue was treated with a Girard T solution and after usual work up the ketonic fraction yielded 16α-acetyl-Δ⁵-pregnene-3β,20β-diol.

*Example II*

3 g. of 16β-carboxy-Δ⁵-17α-pregnene-3β,20β-diol diacetate (J. Romo, Tetrahedron, 3, 37 [1958]), were dissolved in 60 cc. of anhydrous benzene and 10 cc. of the solvent were then allowed to distil off. The resulting solution was cooled and 10 cc. of thionyl chloride were added. The reaction mixture was refluxed for 2 hours, and thereafter evaporated to dryness, thus affording the diacetate of Δ⁵-17α-pregnene-3β,20β-diol - 16β - carboxylic acyl chloride. The latter was dissolved in 30 cc. of benzene, and the resulting solution was added to a methyl cadmium solution prepared previously by: mixing 15 cc. of a 4 N ether solution of methyl magnesium bromide with 60 cc. of benzene, then slowly and with stirring, with 10 g. of anhydrous cadmium chloride, and allowing the resulting reagent solution to stand at room temperature for 30 minutes. The acylchloride-methyl cadmium mixture was refluxed for 4 hours. After cooling there was added dilute hydrochloric acid, the organic layer was separated, washed with water, dried and evaporated to dryness. The residue was treated with Girard T reagent and upon usual work up the ketonic fraction afforded 16β-acetyl-Δ⁵-17α-pregnene-3β,20β-diol.

*Example III*

A solution of 2.0 g. of 16α-acetyl-Δ⁵-pregnene-3β,20β-diol in 100 cc. of ethyl acetate was shaken with 100 mg. of 5% palladium-on-charcoal catalyst in a hydrogen atmosphere until the gas uptake corresponded to one mol. The catalyst was filtered off and the filtrate evaporated to dryness. Recrystallization from acetone-hexane afforded 16α-acetyl-allopregnane-3β,20β-diol.

The same procedure was applied to 16β-acetyl-Δ⁵-17α-pregnene-3β,20β-diol, to give 16β-acetyl-Δ⁵-17α-allopregnane-3β,20β-diol.

*Example IV*

A solution of 1 g. of 16α-acetyl-Δ⁵-pregnene-3β,20β-diol in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water 10% sodium carbonate solution and water until neutral, dried over anhydrous sodium sulfate and evaporated to dryness. Crystallization from acetone-hexane afforded 16α-acetyl-Δ⁴-pregnene-3,20-dione.

When applying the above procedure to 16β-acetyl-Δ⁵-17α-pregnene - 3β,20β - diol, 16α-acetyl-allopregnane-3β,20β-diol, and 16β - acetyl - 17α-allopregnane-3β,20β-diol, there were respectively obtained: 16β-acetyl-Δ⁴-17α-pregnene-3,20-dione, 16α-acetyl-allopregnane-3,20-dione, and 16β-acetyl-17α-allopregnane-3,20-dione.

I claim:
1. 16α-acetyl-Δ⁵-pregnene-3β,20β-diol.
2. 16β-acetyl-Δ⁵-17α-pregnene-3β,20β-diol.
3. 16α-acetyl-allopregnane-3β,20β-diol.
4. 16β-acetyl-17α-allopregnene-3β,20β-*diol*.

References Cited by the Examiner

UNITED STATES PATENTS 3,121,101  2/64  Daase et al. _____ 260—397.3

LEWIS GOTTS, *Primary Examiner.*

M. LIEBMAN, *Examiner.*